(12) United States Patent
Yamamoto et al.

(10) Patent No.: US 11,412,102 B2
(45) Date of Patent: Aug. 9, 2022

(54) INFORMATION PROCESSING APPARATUS, AND NON-TRANSITORY COMPUTER READABLE MEDIUM FOR SPLITTING DOCUMENTS

(71) Applicant: FUJIFILM Business Innovation Corp., Tokyo (JP)

(72) Inventors: Takuma Yamamoto, Kanagawa (JP); Aya Kuwano, Kanagawa (JP); Mitsuru Sato, Kanagawa (JP); Toru Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/037,684

(22) Filed: Sep. 30, 2020

(65) Prior Publication Data

US 2021/0306494 A1    Sep. 30, 2021

(30) Foreign Application Priority Data

Mar. 25, 2020    (JP) .............................. JP2020-055029

(51) Int. Cl.
```
G06F 3/12      (2006.01)
H04N 1/00      (2006.01)
G06V 30/40     (2022.01)
G06V 30/10     (2022.01)
```
(52) U.S. Cl.
CPC ......... *H04N 1/00641* (2013.01); *G06V 30/40* (2022.01); *H04N 1/0044* (2013.01); *H04N 1/00811* (2013.01); *H04N 1/00824* (2013.01); *G06V 30/10* (2022.01)

(58) Field of Classification Search
None
See application file for complete search history.

(56) References Cited

U.S. PATENT DOCUMENTS

| 7,676,089 B2 * | 3/2010 | Nishida | G06V 30/414 |
| | | | 382/176 |
| 8,392,816 B2 * | 3/2013 | Radakovic | G06K 9/00469 |
| | | | 715/200 |

(Continued)

FOREIGN PATENT DOCUMENTS

JP    2009294792    12/2009

*Primary Examiner* — Dung D Tran
(74) *Attorney, Agent, or Firm* — JCIPRNET

(57) ABSTRACT

An information processing apparatus includes a processor configured to: acquire a read image and item information, the read image being an image obtained by reading a paper medium including plural documents, the item information being information of plural items specified by a user from among plural items contained in the documents; extract plural character strings from the read image, each character string being associated with the corresponding one of the items included in the item information; in response to extracting the character strings associated with the item information from the read image, set a split position, the split position being a position at which to split out a portion of the read image as a set of documents, the portion being a portion of the read image from a page where the extracting has begun to a page containing the last extracted character string; and output the read image split in accordance with the split position.

20 Claims, 10 Drawing Sheets

(56) References Cited

U.S. PATENT DOCUMENTS

| | | | |
|---|---|---|---|
| 2011/0075220 A1* | 3/2011 | Chiba | H04N 1/00331 358/2.1 |
| 2014/0009793 A1* | 1/2014 | Tomioka | G06F 3/125 358/1.18 |
| 2015/0215487 A1* | 7/2015 | Maezawa | H04N 1/04 358/474 |
| 2018/0276462 A1* | 9/2018 | Davis | G06K 9/72 |
| 2019/0235797 A1* | 8/2019 | Itogawa | G06F 3/1204 |
| 2021/0058520 A1* | 2/2021 | Dandoko | H04N 1/00331 |

* cited by examiner

FIG. 5

| DOCUMENTATION NUMBER | PAGE RANGE (START - END) | PAGE COUNT | MESSAGE |
|---|---|---|---|
| 1 | 1 - 3 | 3 | |
| 2 | 4 - 7 | 4 | PAGE COUNT EXCEEDS PRESET VALUE. |
| 3 | 8 - 10 | 3 | |

31

INFORMATION PROCESSING APPARATUS, AND NON-TRANSITORY COMPUTER READABLE MEDIUM FOR SPLITTING DOCUMENTS

CROSS-REFERENCE TO RELATED APPLICATIONS

This application is based on and claims priority under 35 USC 119 from Japanese Patent Application No. 2020-055029 filed Mar. 25, 2020.

BACKGROUND

(i) Technical Field

The present disclosure relates to an information processing apparatus, and a non-transitory computer readable medium.

(ii) Related Art

Japanese Unexamined Patent Application Publication No. 2009-294792 discloses an information processing apparatus capable of communicating with a first external apparatus and a second external apparatus. The first external apparatus stores application information including application-determining information for determining an application. The second external apparatus stores saved image data associated with the application-determining information, in such a way that allows the saved image data to be referenced from the first external apparatus. The information processing apparatus includes an input unit, an identifying unit, a splitting unit, an attribute-data generating unit, and a transfer unit. The input unit is used to input image data, the image data being generated by sequentially reading a form that contains the application-determining information stored in the first external apparatus, and a form that does not contain the application-determining information. The identifying unit identifies the application-determining information included in the form that contains the application-determining information. The splitting unit splits the image data input by using the input unit into individual units of application based on the result of identification performed by the identifying unit. The attribute-data generating unit generates, for each piece of image data split by the splitting unit, attribute data including the corresponding application-determining information. The transfer unit transfers the image data split by the splitting unit to the second external apparatus as the saved image data, and transfers the attribute information generated by the attribute-data generating unit to the second external apparatus.

There exist, for example, information processing apparatuses that perform optical character recognition (OCR) that reads an image of a paper medium document filled out by a user to thereby recognize, from the image of the document, a character string entered by the user.

In some cases, OCR is performed on a batch of paper media into which plural documents are combined. For such cases, a technique exists to identify documents as a set of documents. With this technique, the same character, symbol, and other objects are attached to associated documents in advance, and an image obtained by reading a batch of paper media with the same character, symbol, and other objects attached thereto (to be referred to as "read image" hereinafter) is split into individual sets of documents grouped together for each document type or for each unit of application.

In using the above technique to split a read image obtained by reading a batch of paper media into individual document sets, in order to identify each document set, documents with the same character, symbol, or other objects attached thereto need to be prepared for each document set. This means that the technique does not necessarily reduce the burden associated with splitting documents.

SUMMARY

Aspects of non-limiting embodiments of the present disclosure relate to providing an information processing apparatus and a non-transitory computer readable medium that, in splitting a read image obtained by reading a batch of paper media, make it possible to reduce the burden associated with splitting documents, in comparison to a case where documents with the same character, symbol, and other objects attached thereto are prepared in advance for each set of documents to identify the set of documents.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire a read image and item information, the read image being an image obtained by reading a paper medium including plural documents, the item information being information of plural items specified by a user from among plural items contained in the documents; extract plural character strings from the read image, each character string being associated with the corresponding one of the items included in the item information; in response to extracting the character strings associated with the item information from the read image, set a split position, the split position being a position at which to split out a portion of the read image as a set of documents, the portion being a portion of the read image from a page where the extracting has begun to a page containing the last extracted character string; and output the read image split in accordance with the split position.

BRIEF DESCRIPTION OF THE DRAWINGS

Exemplary embodiments of the present disclosure will be described in detail based on the following figures, wherein:

FIG. 5 schematically illustrates exemplary page ranges each representing a split position in accordance with exemplary embodiments;

DETAILED DESCRIPTION

First Exemplary Embodiment

Exemplary embodiments of the present disclosure will be described below in detail with reference to the drawings. The following description is directed to an exemplary case in which an information processing apparatus 10 according to the first exemplary embodiment is a server that manages image data obtained by reading a document, a form, and other objects. However, this is not to be construed restrictively. The information processing apparatus 10 may be incorporated in a multifunction machine having print, copy, scan, facsimile, and other functions, or may be incorporated in a terminal such as a personal computer.

Figure 1:
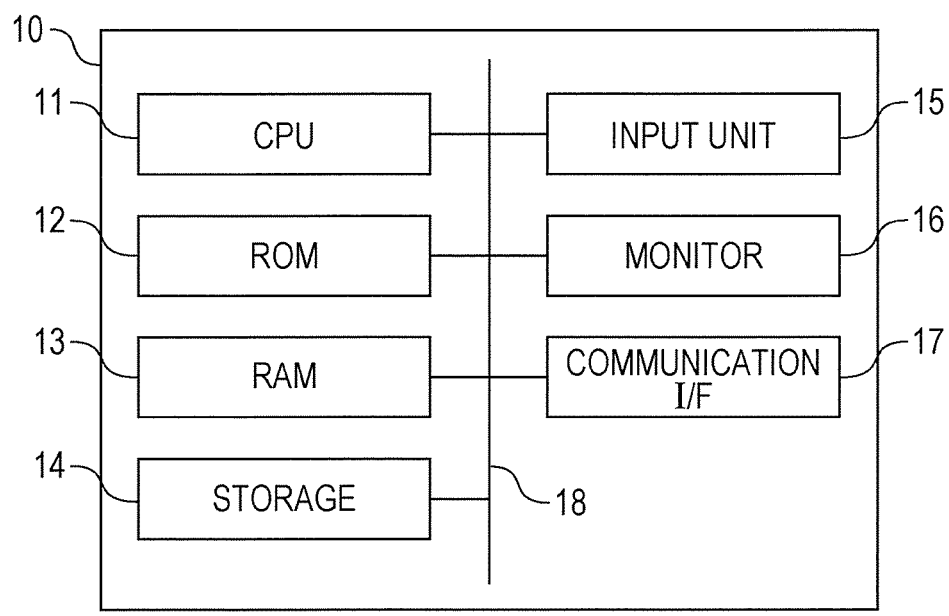
FIG. 1 is a block diagram illustrating an exemplary hardware configuration of an information processing apparatus in accordance with exemplary embodiments.

FIG. 1 is a block diagram illustrating an exemplary hardware configuration of the information processing apparatus 10 in accordance with the first exemplary embodiment. As illustrated in FIG. 1, the information processing apparatus 10 according to the first exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are interconnected by a bus 18. The CPU 11 is an example of a processor.

The CPU 11 controls the entire information processing apparatus 10 in a centralized manner. The ROM 12 stores various programs including an information processing program used in the first exemplary embodiment. The RAM 13 is a memory used as a work area during execution of various programs. The CPU 11 loads a program stored in the ROM 12 into the RAM 13, and executes the program to carry out the process of extracting a character from image data, and storing the extracted character. The storage 14 is, for example, a hard disk drive (HDD), a solid state drive (SSD), or a flash memory. The storage 14 may store an information processing program or other information. The input unit 15 is a keyboard or a mouse to receive input of a character or other information. The monitor 16 displays image data or other information. The communication I/F 17 transmits and receives data.

Figure 2:
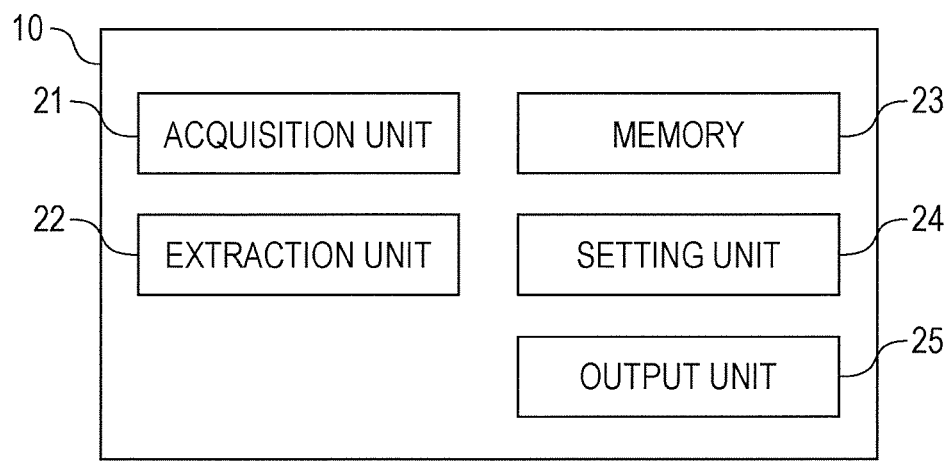
FIG. 2 is a block diagram illustrating an exemplary functional configuration of an information processing apparatus in accordance with exemplary embodiments.

The functional configuration of the information processing apparatus 10 will be described below with reference to FIG. 2. FIG. 2 is a block diagram illustrating an exemplary functional configuration of the information processing apparatus 10 in accordance with the first exemplary embodiment.

As illustrated in FIG. 2, the information processing apparatus 10 includes an acquisition unit 21, an extraction unit 22, a memory 23, a setting unit 24, and an output unit 25. By executing an information processing program, the CPU 11 functions as the acquisition unit 21, the extraction unit 22, the memory 23, the setting unit 24, and the output unit 25.

The acquisition unit 21 acquires an image obtained by reading a paper medium including plural documents (to be referred to as "read image" hereinafter), and information of plural items specified by a user from among items contained in the documents (to be referred to as "item information" hereinafter). The acquisition unit 21 acquires the following pieces of information: a user-specified preset value of the maximum number of pages of one set of documents, and a user-specified preset value of the maximum number of copies of one set of documents; a user-specified split position at which to split out a set of documents; and an extraction region from which to extract a character string.

The following description of the first exemplary embodiment is directed to a case in which items and character strings written in each document are extracted from a read image through OCR. In this regard, examples of items include items written in a document and representing information to be entered by a user, such as "name" and "address", and examples of character strings include the user's own name, the user's own address, and other such character strings entered by the user. As used in the first exemplary embodiment, the terms "set of documents" and "document set" refer to a suite of multiple-page documents submitted by the same person.

The extraction unit 22 uses item information to extract, from a read image, character strings associated with the corresponding items included in the read image. The extraction unit 22 also extracts an extraction region where each extracted character string is located.

The memory 23 stores a split read image, character strings acquired from the read image, and extraction regions where the corresponding character strings are located.

The setting unit 24 sets a split position in response to extracting, from a read image, individual character strings associated with the item information. The split position is a position at which to split out a portion of the read image as a set of documents, the portion being a portion of the read image from a page where the extracting has begun to a page containing the last extracted character string.

The output unit 25 outputs the read image split in accordance with the split position.

The following description of the first exemplary embodiment is directed to a case in which the item information includes necessary and selective items. Necessary items each refer to an item that has necessarily to be included in one of documents contained in a document set. The information processing apparatus 10 sets a split position in response to extracting all necessary items. Selective items refer to plural items specified by the user, at least one of which is to be included in one of documents contained in a document set. The information processing apparatus 10 sets a split position in response to extracting at least one of selective items.

In other words, if only necessary items have been specified, the information processing apparatus 10 sets a split position in response to extracting all character strings associated with items specified as the necessary items. If necessary items and selective items have been specified, the information processing apparatus 10 sets a split position in response to extracting all character strings associated with the necessary items, and in response to extracting a character string associated with one of items specified as the selective items.

Before describing operation of the information processing apparatus 10, a description will now be given with reference to FIGS. 3 to 6 of a method according to the first exemplary embodiment for setting a split position. The following description of the first exemplary embodiment is directed to a case in which only necessary items have been specified.

Figure 3:
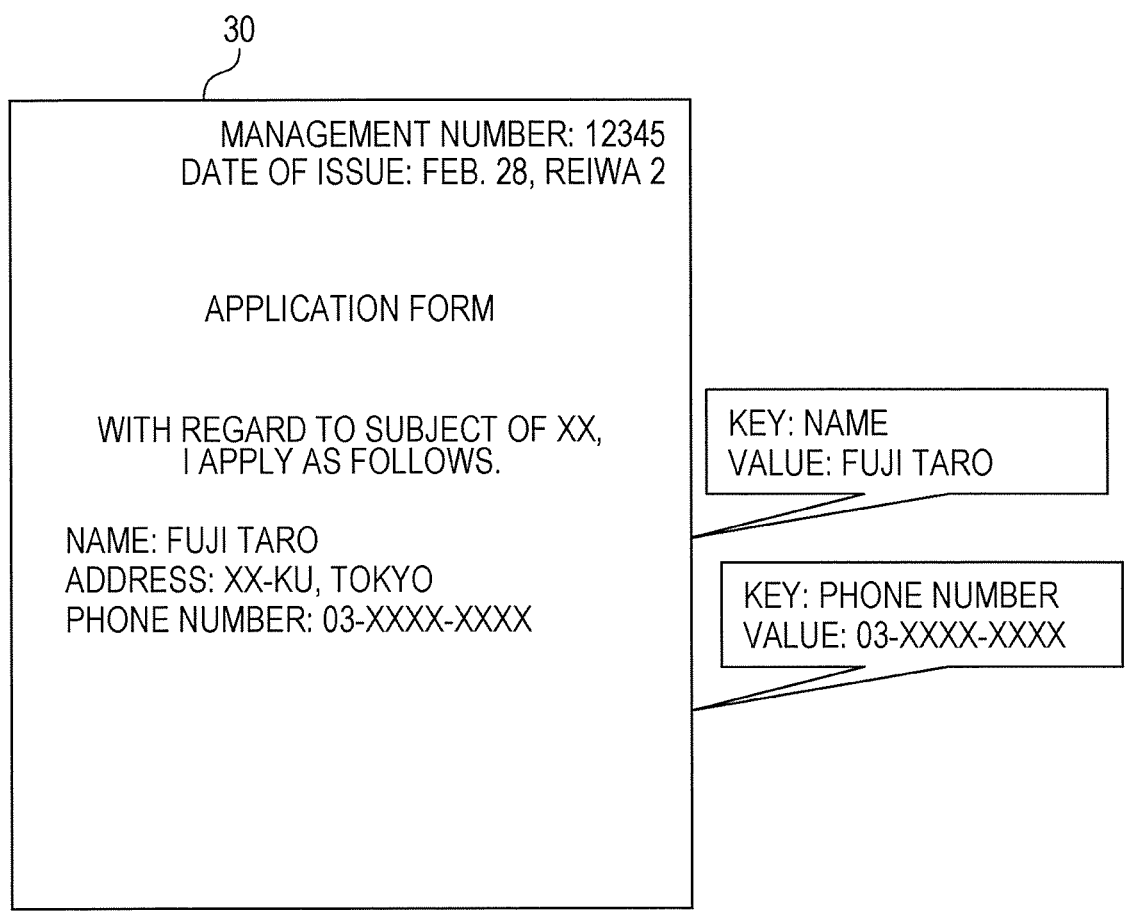
FIG. 3 illustrates an exemplary read document in accordance with exemplary embodiments.
Figure 4:
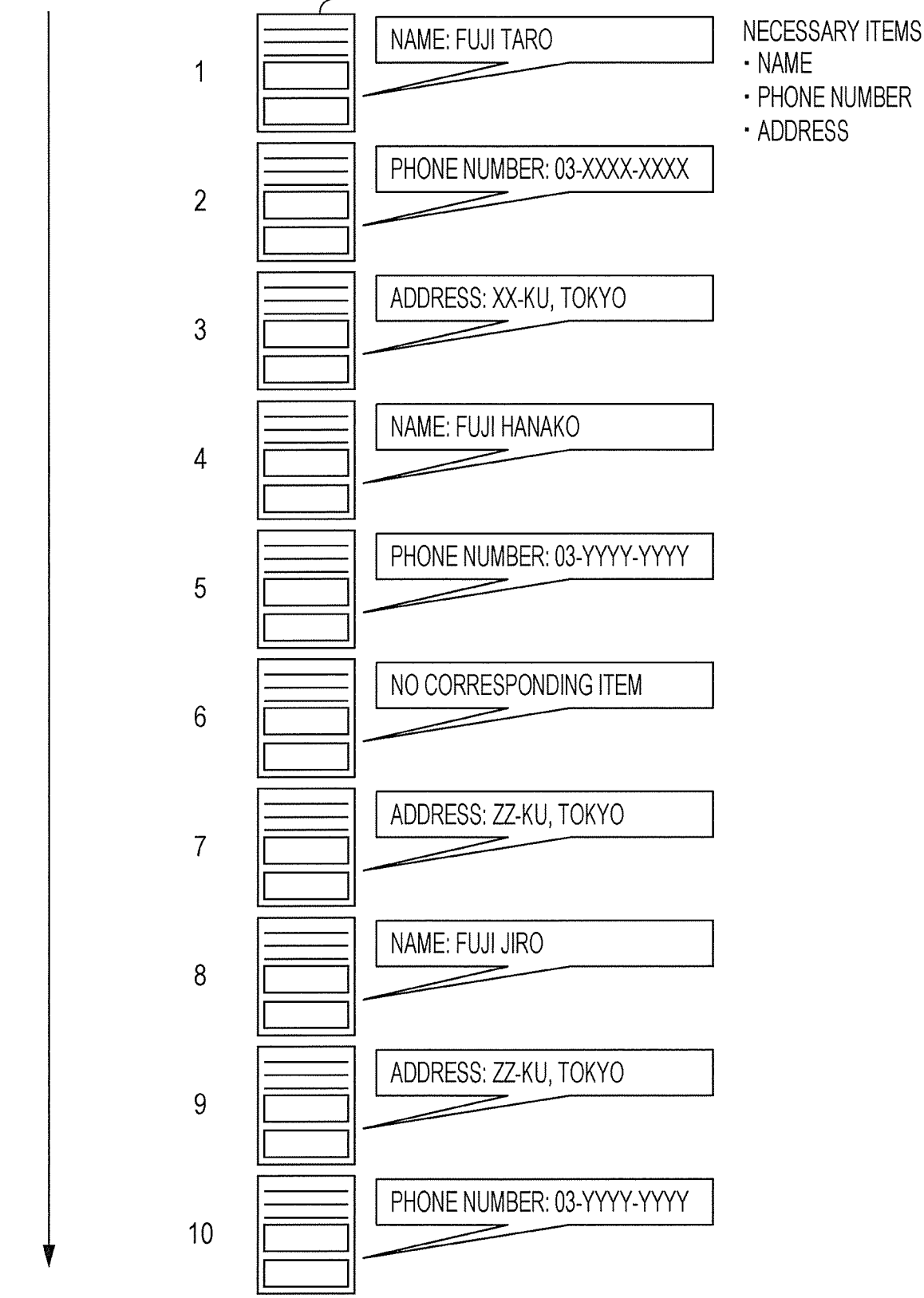
FIG. 4 schematically illustrates exemplary documents used to explain how individual split positions are set in accordance with a first exemplary embodiment.

Now, with reference to FIGS. 3 and 4, setting of a split position will be described first. FIG. 3 schematically illustrates an exemplary document that has been read in accordance with the first exemplary embodiment. FIG. 4 schematically illustrates exemplary documents used to explain how individual split positions are set in accordance with the first exemplary embodiment.

For instance, as illustrated in FIG. 3, a document includes the following items: management number, date of issue, name, address, and phone number. A character string is written beside each corresponding item, as in "name: Fuji Taro". In response to "name" being specified by the user as an item to be extracted, the information processing apparatus 10 extracts, from the result of OCR performed on a read image obtained by reading the document, the character string "Fuji Taro" written beside the item "name". Specifying an item in advance, and extracting a character string associated with the specified item in this way is called "key-value extraction". The following description of the first exemplary embodiment is directed to extraction of a character string (value) corresponding to an item (key) written in each individual document. For key-value extraction, the relative position of a character string associated with an item (i.e., the positional relationship between an item and a character string, which in the first exemplary embodiment refers to where a character string can possibly exist with reference to an item) needs to be set in advance. The following description of the first exemplary embodiment is directed to a case in which a setting is made so as to extract a character string located to the right of an item.

The information processing apparatus 10 acquires a read image, which is an image obtained by reading plural documents, and item information representing plural user-specified items to be extracted.

The information processing apparatus 10 extracts, from the read image, items related to the item information, and character strings associated with the corresponding items, and stores the extracted items and the extracted character strings. For instance, if, as illustrated in FIG. 3, "name" and "phone number" are specified as item information, and the position to the right of item information is specified as the relative position of the associated character string, the information processing apparatus 10 extracts the character string "Fuji Taro" written to the right of the item "name" (excluding, however, ":"). The information processing apparatus 10 stores "Fuji Taro" in association with "name", which is a necessary item. Further, the information processing apparatus 10 extracts "03-XXXX-XXXX" written to the right of "phone number", and stores "03-XXXX-XXXX" in association with "phone number", which is a necessary item. In response to extracting "name" and "phone number" specified as necessary items, the information processing apparatus 10 regards, as one set of documents, the pages from the first page to the page containing the last extracted one of the two items "name" and "phone number", stores the page numbers of these pages, and sets a split position.

There are situations in which, if a single page contains plural items specified as necessary items, plural character strings are extracted from the single page, resulting in an excessive number of split positions being set. In this case, by making a setting such that only a single character string is to be extracted from a single page, it is possible to avoid the possibility of an excessive number of split positions being set due to plural character strings being extracted from a single page.

As illustrated in FIG. 4, in response to "name", "phone number", and "address" being specified as necessary items, the information processing apparatus 10 extracts, sequentially from the image of the document on the first page, one of the items "name", "phone number", and "address".

The following describes an exemplary case in which "name: Fuji Taro" has been extracted from the image of the document on the first page, "telephone number: 03-XXXX-XXXX" has been extracted from the image of the document on the second page, and "address: XX-ku, Tokyo" has been extracted from the image of the document on the third page. In response to extracting all items specified as necessary items from the images of individual documents, the information processing apparatus 10 regards the first to third pages as one set of documents, stores the page numbers of these pages, and sets a split position. Then, from the fourth page immediately following the page containing the last extracted character string, the information processing apparatus 10 resumes the process of extracting character strings associated with necessary items.

The foregoing description of the first exemplary embodiment is directed to a case in which if a single page contains plural items, a single item is extracted from the single page. However, this is not to be construed restrictively. In one alternative example, if a single page contains plural items, a user-specified priority may be set for each item to be extracted, and an item to be extracted may be selected in accordance with the priority. In another alternative example, in response to detecting that one of plural items contained in a single page is contained in another page, another item may be determined to have been extracted from the single page. Further, the character strings to be extracted may be extracted in any order irrespective of the order of items set as necessary items.

If the information processing apparatus 10 fails to extract a character string from a page, the information processing apparatus 10 continues processing while skipping the page from which no character string has been successfully extracted. In this way, a read image is split into a set of documents. For example, as illustrated in FIG. 4, in response to failing to extract an item specified as a necessary item from the sixth page, the information processing apparatus 10 extracts items specified as necessary items from the fourth, fifth, and seventh pages preceding or following the sixth page, and sets a split position with the fourth to seventh pages as one set of documents. In this way, a read image is split into a set of documents even if an item has not been successfully extracted from some page.

In some cases, however, if there are plural successive pages from which no character string has been successfully extracted, this may result in plural sets of documents being combined into one. In this case, by previously setting an upper limit to the number of pages of one document set, it is possible to prevent plural document sets from being combined into one. Specifically, the information processing apparatus 10 acquires a user-specified value of the maximum number of pages of one document set, and sets the acquired value as a preset value. If the number of pages of a document set exceeds the preset value, the information processing apparatus 10 sets a split position with the documents up to the immediately preceding page being split out as one document set.

The foregoing description of the first exemplary embodiment is directed to a case in which the maximum number of pages, which is an upper limit number of pages of one document set, is set as a preset value. However, this is not to be construed restrictively. A preset value to be set may be the maximum number of copies representing an upper limit number of copies of one document set contained in a read image. For example, in some cases, if the information processing apparatus 10 extracts an item not expected by the user, a split position is set at an unintended position, and this results in an excessive number of split positions being set. In this case, setting an upper limit to the number of copies of one document set allows for earlier detection of setting of an excessive number of split positions.

The foregoing description of the first exemplary embodiment is directed to a case in which each extracted character string is stored. However, this is not to be construed restrictively. Alternatively, a region including a position where each character string has been extracted may be stored. In this regard, a user-specified character string is expected to be placed at the same position in each individual document. Therefore, by storing a region including a position where each character string has been extracted, and extracting the corresponding character string from the stored region in each individual document, the character string may be extracted easily.

If a single page includes plural extraction regions from which character strings have been extracted, a user's specification of a region from which to extract a character string may be accepted. Alternatively, in such a case, priorities may be set for individual regions, and extraction of character strings may be performed in accordance with the priorities. Such priorities may be specified by the user. Alternatively, by using the results of extraction carried out in the past on the same document, the priorities for individual regions may be set in descending order of the number of extractions.

Figure 6:
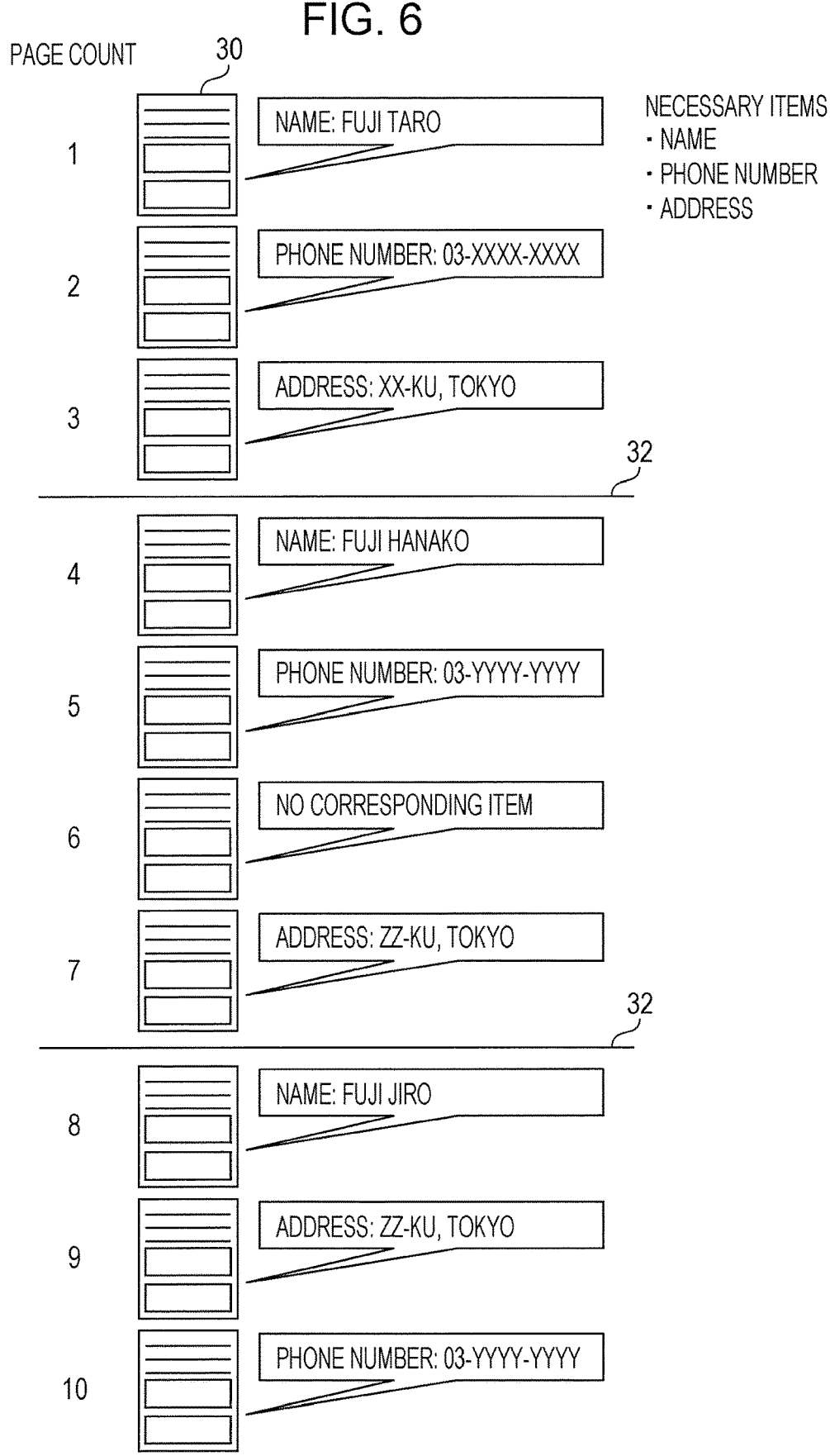
FIG. 6 schematically illustrates how individual split positions and individual document sets are displayed in accordance with exemplary embodiments.

A description will now be given with reference to FIGS. 5 and 6 of a method for displaying split documents. FIG. 5 schematically illustrates exemplary page ranges each representing a split position in accordance with the first exemplary embodiment. FIG. 6 schematically illustrates how individual split positions and individual document sets are displayed in accordance with the first exemplary embodiment.

First, with reference to FIG. 5, the following describes an example of how the page range of each split-out document set is displayed.

For example, as illustrated in FIG. 5, the information processing apparatus 10 includes a split-position display region 31. The split-position display region 31 shows "documentation number", "page range", "page count", and "message". A documentation number represents a number uniquely assigned to each individual split-out document set. A page range represents the start and end pages of each document set contained in documents acquired as a read image. A page count represents the number of pages of each document set. A message represents a character string used to notify the user if, for example, a preset value has been exceeded for the corresponding document set.

As illustrated in FIG. 5, in accordance with a split position that has been set, the information processing apparatus 10 displays, for each document set, a page range, a page count, and a message for presentation to the user. If, in setting a split position, a preset value has been exceeded, the information processing apparatus 10 provides notification in the form of a message indicating that the preset value has been exceeded.

The foregoing description of the first exemplary embodiment is directed to a case in which notification is provided if a preset value has been exceeded. However, this is not to be construed restrictively. In one alternative example, if a preset value has been exceeded, processing may be stopped. In another alternative example, if a preset value has been exceeded, processing may be stopped, and notification of a preset value being exceeded may be provided. In another alternative example, if a preset value has been exceeded, a user's specification of a split position may be accepted for a set of documents for which the present value has been exceeded.

The foregoing description of the first exemplary embodiment is directed to a case in which a page range, a page count, and a message are displayed in association with a split position. However, this is not to be construed restrictively. In one alternative example, in accordance with a page range, a read image may be split, and the result may be displayed on a monitor. In another alternative example, a read image may be split, and the result may be transmitted to a server or other such device installed in a different location. In another alternative example, a split position that has been set may be displayed together with a read image. For example, as illustrated in FIG. 6, the information processing apparatus 10 may display a list of acquired read images 30, and each split position 32.

As illustrated in FIG. 6, the information processing apparatus 10 displays, on the monitor 16, each read image 30, and each split position 32 that has been set. Further, the information processing apparatus 10 may, in response to an instruction from the user, accept correction, addition, or deletion of the set split position 32.

Figure 7:
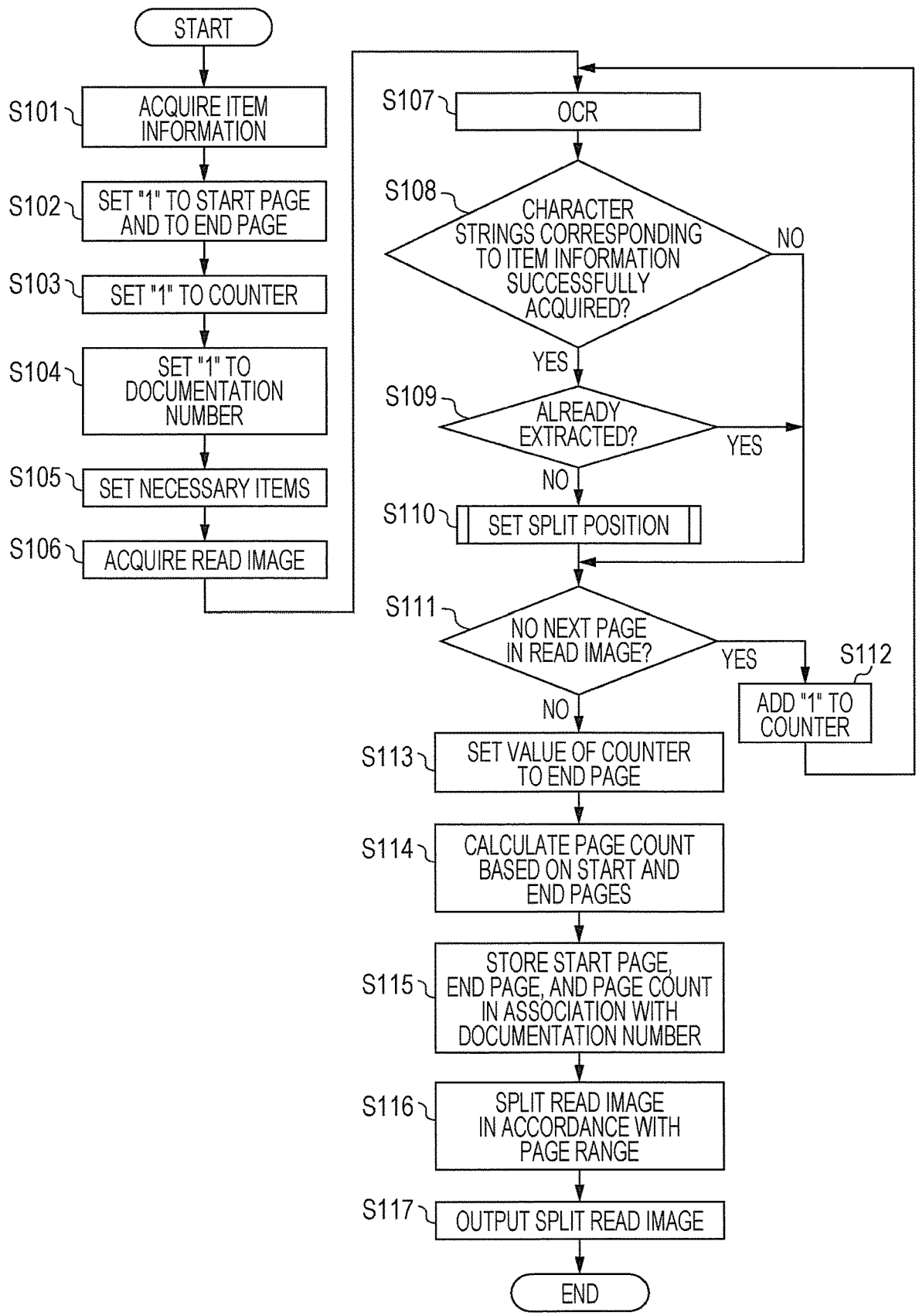
FIG. 7 is a flowchart illustrating exemplary information processing in accordance with the first exemplary embodiment.
Figure 8:
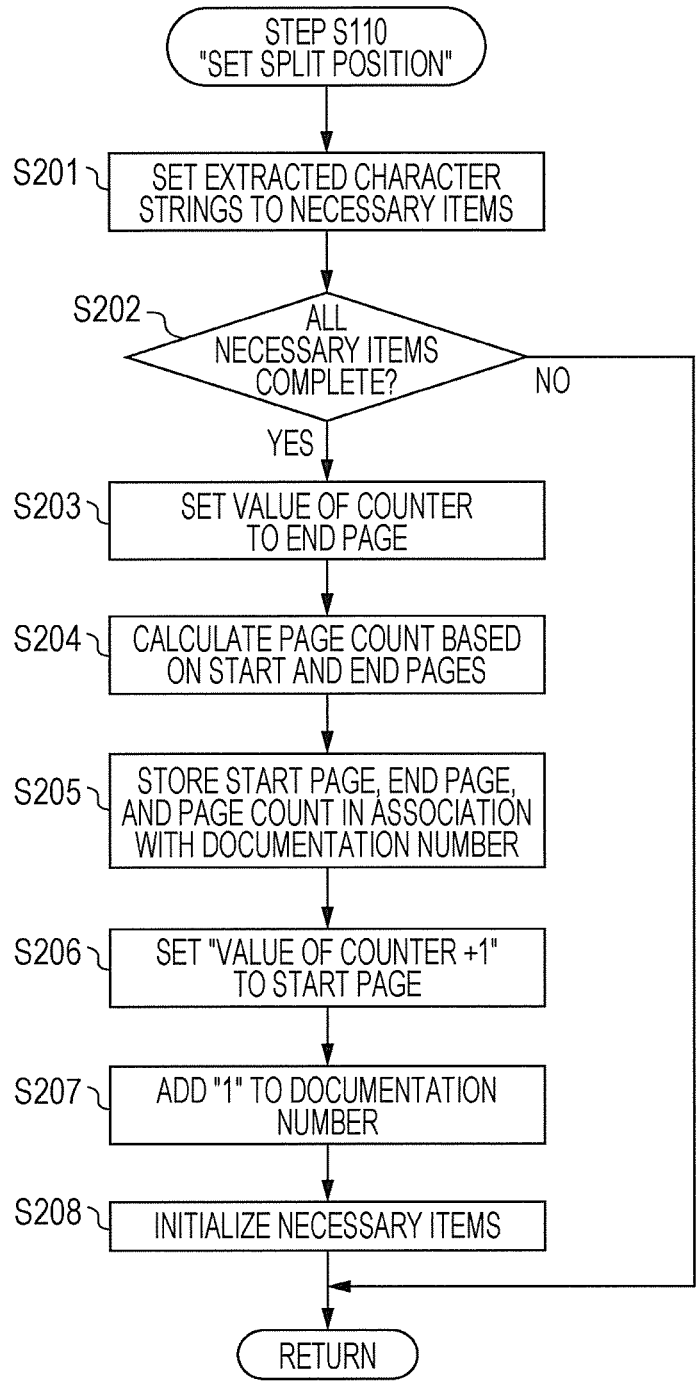
FIG. 8 is a flowchart illustrating an exemplary split-position setting process in accordance with the first exemplary embodiment.

A description will now be given with reference to FIGS. 7 and 8 of operation of an information processing program according to the first exemplary embodiment. FIG. 7 is a flowchart illustrating exemplary information processing in accordance with the first exemplary embodiment. The information processing illustrated in FIG. 7 is executed by the CPU 11 reading the information processing program from the ROM 12 or the storage 14 and executing the program. The information processing in FIG. 7 is executed in response to, for example, the user inputting an instruction that the information processing program be executed.

At step S101, the CPU 11 acquires item information specified by the user.

At step S102, the CPU 11 sets "1" an initial value to the start page and to the end page.

At step S103, the CPU 11 sets "1" to the counter.

At step S104, the CPU 11 sets "1" to the documentation number.

At step S105, the CPU 11 sets necessary items included in item information.

At step S106, the CPU 11 acquires a read image, which is a document image to be read.

At step S107, the CPU 11 executes OCR on a read image with a number of pages corresponding to the value of the counter, and acquires items and character strings from the read image.

At step S108, the CPU 11 determines whether character strings corresponding to the item information have been successfully extracted from the read image. If character strings corresponding to the item information have been successfully extracted (step S108: YES), the CPU 11 transfers to step S109. If character strings corresponding to the item information have not been successfully extracted (step S108: NO), the CPU 11 transfers to step S111.

At step S109, the CPU 11 determines whether the extracted character strings are already-extracted character strings. If the extracted character strings are already-extracted character strings (step S109: YES), the CPU 11 transfers to step S111. If the extracted character strings are not already-extracted character strings (step S109: NO), the CPU 11 transfers to step S110.

At step S110, the CPU 11 performs a split-position setting process. The split-position setting process will be described later in detail with reference to FIG. 8.

At step S111, the CPU 11 determines whether the read image has no next page. If the read image has no next page (step S111: NO), the CPU 11 transfers to step S113. If the read image has the next page (step S111: YES), the CPU 11 transfers to step S112.

At step S112, the CPU 11 adds "1" to the counter, and then transfers to step S107.

At step S113, the CPU 11 sets the value of the counter to the end page.

At step S114, the CPU 11 calculates the page count based on the start and end pages.

At step S115, the CPU 11 stores the start page, the end page, and the page count in association with the documentation number.

At step S116, the CPU 11 splits the read image in accordance with the page range (the start page and the end page).

At step S117, the CPU 11 outputs the split read image. A description will now be given with reference to FIG. 8 of operation of a split-position setting processing program according to the first exemplary embodiment. FIG. 8 is a flowchart illustrating an exemplary split-position setting process in accordance with the first exemplary embodiment. The information processing illustrated in FIG. 8 is executed by the CPU 11 reading the split-position setting processing program from the ROM 12 or the storage 14 and executing the program. The split-position setting process in FIG. 8 is executed in response to, for example, input of an instruction to execute the split-position setting processing program from the information processing program.

At step S201, the CPU 11 sets extracted character strings to necessary items.

At step S202, the CPU 11 determines whether all necessary items are complete. If all necessary items are complete (step S202: YES), the CPU 11 transfers to step S203. If not all necessary items are complete (step S202: NO), the CPU 11 terminates the split-position setting process.

At step S203, the CPU 11 sets the value of the counter to the end page.

At step S204, the CPU 11 calculates the number of pages based on the start and end pages.

At step S205, the CPU 11 stores the start page, the end page, and the page count in association with the documentation number.

At step S206, the CPU 11 sets "counter value +1" to the start page.

At step S207, the CPU 11 adds "1" to the documentation number.

At step S208, the CPU 11 initializes necessary items.

As described above, a split position is set for each set of documents through key-value extraction. Therefore, in comparison to previously preparing documents with the same character, symbol, and other objects attached thereto for each set of documents to identify the set of documents, the configuration according to the first exemplary embodiment may reduce the burden associated with splitting documents.

Second Exemplary Embodiment

The foregoing description of the first exemplary embodiment is directed to extracting character strings associated with items specified as necessary items to thereby set a split position. The following description of a second exemplary embodiment is directed to extracting character strings associated with items specified as necessary and selective items to thereby set a split position. The hardware configuration (see FIG. 1) of the information processing apparatus 10 according to the second exemplary embodiment, the functional configuration (see FIG. 2) of the information processing apparatus 10, and the schematic illustration (see FIG. 3) of a document are the same as those in the first exemplary embodiment, and thus will not be described in further detail. Further, the schematic illustration (see FIG. 5) of page ranges each representing a split position according to the second exemplary embodiment, and the schematic illustration (see FIG. 6) of each split position and each set of documents are the same as those in the first exemplary embodiment, and thus will not be described in further detail.

Figure 9:
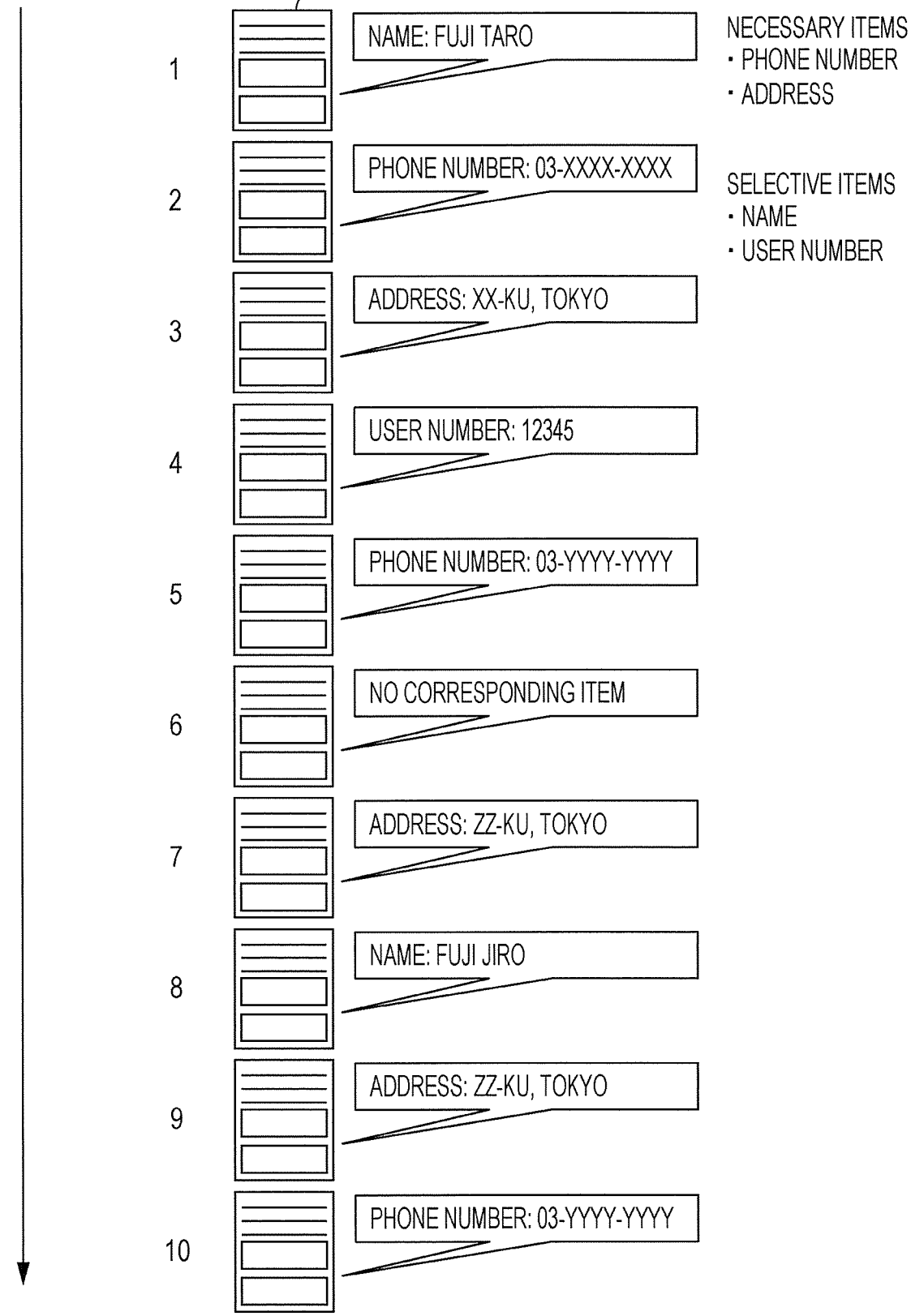
FIG. 9 schematically illustrates exemplary documents used to explain how individual split positions are set in accordance with a second exemplary embodiment.

Before describing operation of the information processing apparatus 10, a description will now be given with reference to FIG. 9 of a method according to the second exemplary embodiment for setting a split position. FIG. 9 schematically illustrates exemplary documents used to explain how individual split positions are set in accordance with the second exemplary embodiment.

For some items, for example, "name" and "user number", if one of these items is identified, then another item is also identified. Specifically, the item "user number" is often associated with some user information, typically with the item "name", which is a piece of user information for uniquely identifying a user. In other words, it is possible to identify "user number" from "name", or identify "name" from "user number". As described above, there are cases in which, in splitting out a set of documents through key-value extraction, if one of plural equivalent items of information, such as "name" and "user number", is extracted, then sufficient necessary information is obtained.

Accordingly, the following description of the second exemplary embodiment is directed to a case in which, in response to extracting at least one of "name" and "user number" specified as necessary items, a split position is set for a read image to split the read image into a set of documents.

A case is now considered in which, for example, as illustrated in FIG. 9, "phone number" and "address" are specified as necessary items, and "name" and "user number" are specified as selective items. In this case, the information processing apparatus 10 extracts the necessary items and the selective items from a read image. In response to extracting "name" from the first page, "phone number" from the second page, and "address" from the third page, the information processing apparatus 10 sets a split position with the first to third pages as one set of documents.

In response to extracting "user number" from the fourth page, "phone number" from the fifth page, and "address" from the seventh page, the information processing apparatus 10 sets a split position with the fourth to seventh pages as one set of documents.

In other words, in response to extracting all items specified as necessary items, and extracting at least one of items specified as selective items, a split position is set to combine the corresponding documents into one set of documents.

Figure 10:
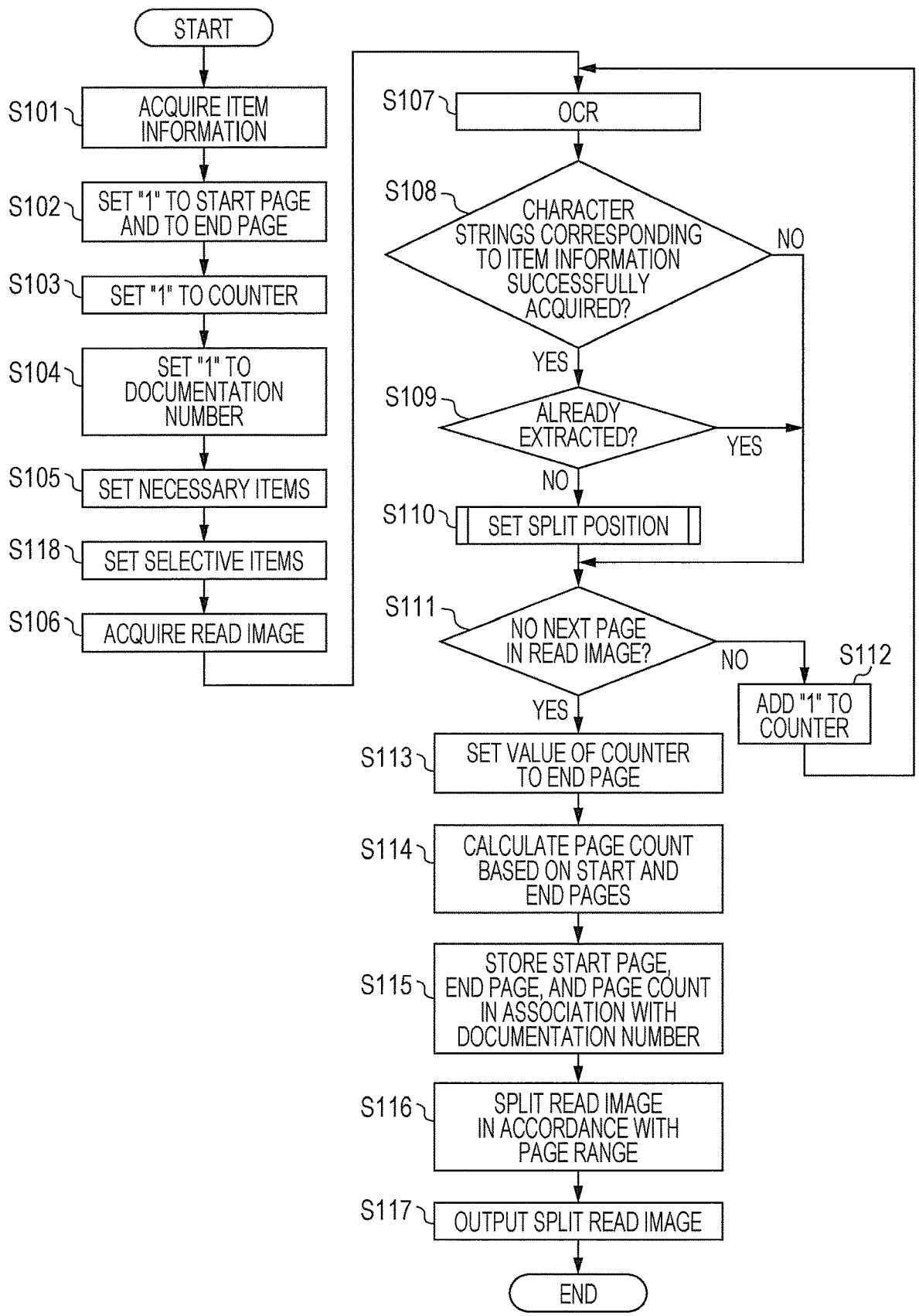
FIG. 10 is a flowchart illustrating exemplary information processing in accordance with the second exemplary embodiment.
Figure 11:
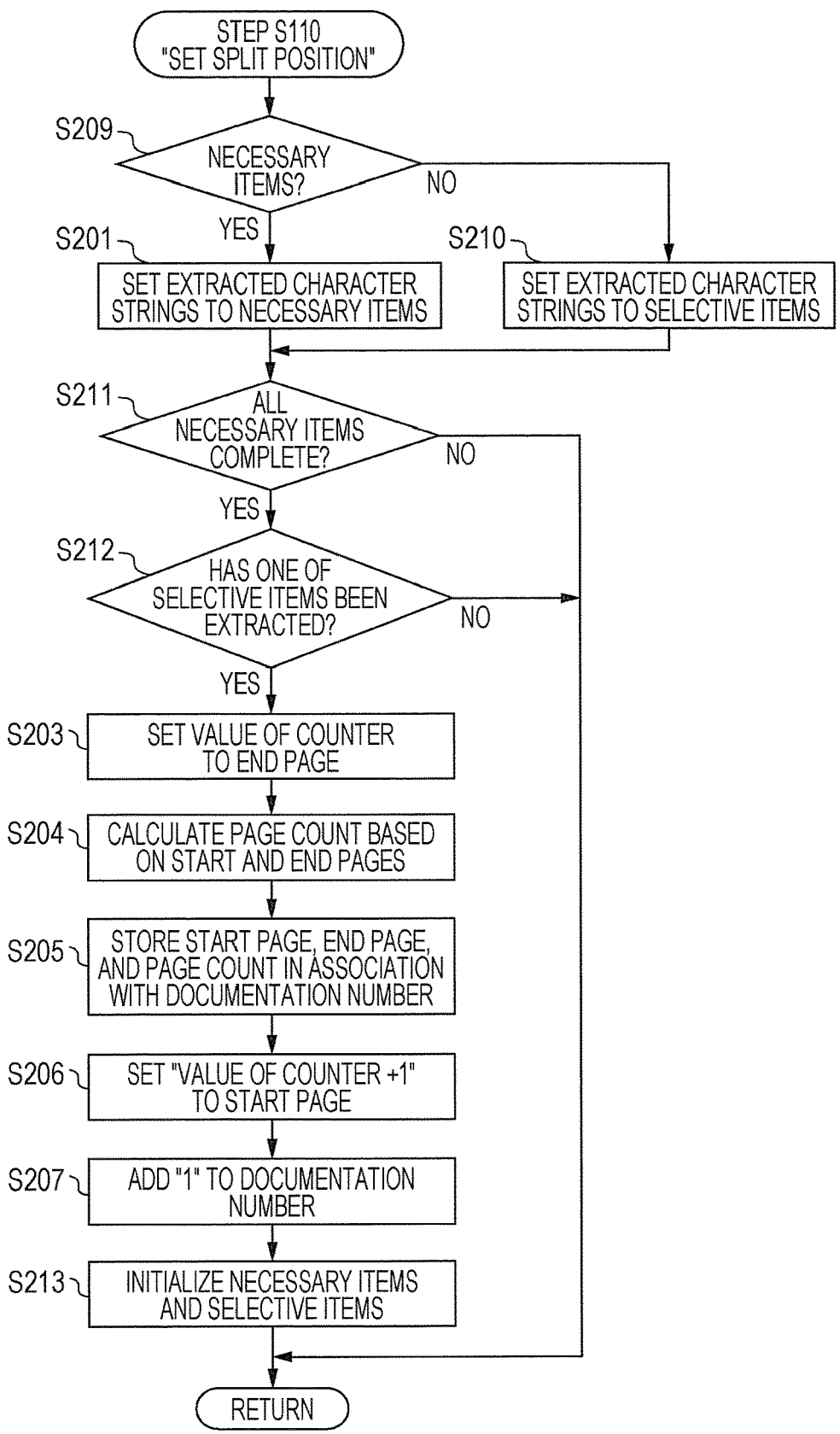
FIG. 11 is a flowchart illustrating an exemplary split-position setting process in accordance with the second exemplary embodiment.

A description will now be given with reference to FIGS. 10 and 11 of operation of an information processing program according to the second exemplary embodiment. FIG. 10 is a flowchart illustrating exemplary information processing in accordance with the second exemplary embodiment. The information processing illustrated in FIG. 10 is executed by the CPU 11 reading the information processing program from the ROM 12 or the storage 14 and executing the program. The information processing in FIG. 10 is executed in response to, for example, the user inputting an instruction that the information processing program be executed. Steps in FIG. 10 identical to those of the information processing illustrated in FIG. 7 will be denoted by reference signs identical to those illustrated in FIG. 7, and thus will not be described in further detail.

At step S118, the CPU 11 sets necessary items included in item information.

A description will now be given with reference to FIG. 11 of operation of a split-position setting processing program according to the second exemplary embodiment. FIG. 11 is a flowchart illustrating an exemplary split-position setting process in accordance with the second exemplary embodiment. The information processing illustrated in FIG. 11 is executed by the CPU 11 reading the split-position setting processing program from the ROM 12 or the storage 14 and executing the program. The split-position setting process in FIG. 11 is executed in response to, for example, input of an instruction to execute the split-position setting processing program from the information processing program. Steps in FIG. 11 identical to those of the information processing illustrated in FIG. 8 will be denoted by reference signs identical to those illustrated in FIG. 8, and thus will not be described in further detail.

At step S209, the CPU 11 determines whether the extracted character strings are character strings corresponding to necessary items. If the extracted character strings correspond to necessary items (step S209: YES), the CPU 11 transfers to step S201. If the extracted character strings do not correspond to necessary items (step S209: NO), the CPU 11 transfers to step S210.

At step S210, the CPU 11 sets the extracted character strings to necessary items.

At step S211, the CPU 11 determines whether all necessary items are complete. If all necessary items are complete (step S211: YES), the CPU 11 transfers to step S212. If not all necessary items are complete (step S211: NO), the CPU 11 terminates the split-position setting process.

At step S212, the CPU 11 determines whether one of selective items has been extracted. If one of selective items has been extracted (step S212: YES), the CPU 11 transfers to step S203. If no selective item has been extracted (step S212: NO), the CPU 11 terminates the split-position setting process.

At step S213, the CPU 11 initializes necessary items and selective items.

The foregoing description of the second exemplary embodiment is directed to a case in which there is one kind of selective items. However, this is not to be construed restrictively. Alternatively, plural kinds of selective items may be set. For such plural kinds of selective items, whether at least one of items set as selective items has been extracted may be determined for each kind of selective items.

As described above, a read image is split into a set of documents also if one of items set as selective items has been extracted. Therefore, in comparison to previously preparing documents with the same character, symbol, and other objects attached thereto for each set of documents to identify the set of documents, the configuration according to the second exemplary embodiment may reduce the burden associated with splitting documents.

The foregoing description of the present disclosure is directed to extracting item information including necessary and selective items to thereby set a split position, and splitting a read image into a set of documents. However, this is not to be construed restrictively. Alternatively, a character string associated with each item may be stored, and the stored character string and an extracted character string may be compared with each other. Specifically, a common character string characterizing a split-out set of documents is extracted and stored. If an extracted character string corresponds to the stored character string, an image of a document from which the character string has been extracted is grouped into the split-out set of documents.

For example, a management number assigned for each set of documents is extracted. If the extracted management number is identical to a management number assigned to a split-out set of documents, an image of the document from which the management number has been extracted is stored together with the set of documents having the same management number.

In other words, a common character string is stored for each set of documents, and the stored character string and an extracted character string are compared with each other. This ensures that even if a portion of a set of documents is mixed in another set of documents, a mix-up of documents is detected.

The configuration of the information processing apparatus 10 described with reference to the above exemplary embodiments is only illustrative, and may be modified according to the circumstances without departing from the scope of the present disclosure.

The procedure for processing executed by each program described with reference to the above exemplary embodiments is also only illustrative. Unnecessary steps may be removed, new steps may be added, or the order of processing may be changed, without departing from the scope of the present disclosure.

In the embodiments above, the term "processor" refers to hardware in a broad sense. Examples of the processor includes general processors (e.g., CPU: Central Processing Unit), and dedicated processors (e.g., GPU: Graphics Processing Unit, ASIC: Application-Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiment above, and may be changed.

Although the foregoing description of the exemplary embodiments is directed to a case in which the program for processing information is pre-stored (pre-installed) in the storage 14, this is not to be construed restrictively. The program may be provided while being stored in a storage medium, examples of which include a compact disc read only memory (CD-ROM), a digital versatile disc read only memory (DVD-ROM), and a universal serial bus (USB) memory. Alternatively, the program may be downloaded from an external apparatus via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
    acquire a read image and item information, the read image being an image obtained by reading a paper medium including a plurality of documents, the item information being information of a plurality of items specified by a user from among a plurality of items contained in the plurality of documents,
    extract a plurality of character strings from the read image, each character string being associated with a corresponding one of the plurality of specified items contained in the plurality of documents and included in the item information,
    in response to extracting the plurality of character strings associated with the item information from the read image, set a split position, the split position being a position at which to split out a portion of the read image as a set of documents, the portion being a portion of the read image from a first page where the extracting has begun to a last page containing a last extracted character string in the plurality of documents, and
    output the read image split in accordance with the split position.

2. The information processing apparatus according to claim 1,
    wherein the processor is further configured to acquire a preset value of at least one of a maximum number of pages of the set of documents and a maximum number of copies of the set of documents, and to, in response to the preset value being exceeded, notify that the preset value has been exceeded.

3. The information processing apparatus according to claim 2,
    wherein the processor is further configured to, in response to the preset value being exceeded, further acquire a user-specified split position, and to, in accordance with the acquired user-specified split position, split and output a set of documents for which the preset value has been exceeded.

4. The information processing apparatus according to claim 2,
    wherein the processor is further configured to stop a process in response to the preset value being exceeded, the process being a process of extracting the plurality of character strings associated with the item information from the read image.

5. The information processing apparatus according to claim 1,
    wherein the processor is further configured to display the read image and the split position.

6. The information processing apparatus according to claim 2,
    wherein the processor is further configured to display the read image and the split position.

7. The information processing apparatus according to claim 3,
    wherein the processor is further configured to display the read image and the split position.

8. The information processing apparatus according to claim 4,
    wherein the processor is further configured to display the read image and the split position.

9. The information processing apparatus according to claim 5,
    wherein the processor is further configured to acquire a user-specified split position, and to, in accordance with the acquired user-specified split position, perform at least one of correction, addition, and deletion of the set split position.

10. The information processing apparatus according to claim 6,
    wherein the processor is further configured to acquire a user-specified split position, and to, in accordance with the acquired user-specified split position, perform at least one of correction, addition, and deletion of the set split position.

11. The information processing apparatus according to claim 1,
    wherein the processor is further configured to acquire an extraction region from which each character string is to be extracted, and to extract, from the extraction region of the read image, each character string associated with the item information.

12. The information processing apparatus according to claim 11,
    wherein the processor is further configured to, if a single page includes a plurality of the extraction regions, set a priority for each extraction region.

13. The information processing apparatus according to claim 11,
    wherein the processor is further configured to store a region from which each character string has been extracted, and to set the stored region as the extraction region.

14. The information processing apparatus according to claim 1,
    wherein the processor is further configured to, in response to extracting a plurality of the character strings associated with the item information from a single page contained in the read image, select one of the extracted plurality of character strings.

15. The information processing apparatus according to claim 14,
    wherein the processor is further configured to set a priority for each item included in the item information, and to select a character string based on the priority.

16. The information processing apparatus according to claim 1,
    wherein the processor is further configured to set a plurality of necessary items from among the plurality of items included in the item information, and to, in response to extracting all of a plurality of character strings associated with the plurality of necessary items, set a split position, the split position being a position at which a portion of the read image up to a page containing a last extracted character string is to be split out as a set of documents.

17. The information processing apparatus according to claim 16,
    wherein the processor is further configured to set a plurality of necessary items and a plurality of selective items from among the plurality of items included in the item information, and to, in response to extracting all of a plurality of character strings associated with the plurality of necessary items and extracting at least one of a plurality of character strings associated with the plurality of selective items, set a split position, the split position being a position at which a portion of the read image up to a page containing a last extracted character string is to be split out as a set of documents.

18. The information processing apparatus according to claim 1,
wherein the processor is further configured to, in response to extracting the plurality of character strings from the read image, resume extraction from a page immediately following a page containing a last extracted character string.

19. The information processing apparatus according to claim 1, wherein each of the character strings has a predetermined positional relationship with the corresponding one of the plurality of specified items contained in the plurality of documents.

20. A non-transitory computer readable medium storing a program causing a computer to execute a process for processing information, the process comprising:

acquiring a read image and item information, the read image being an image obtained by reading a paper medium including a plurality of documents, the item information being information of a plurality of items specified by a user from among a plurality of items included in the plurality of documents;

extracting a plurality of character strings from the read image, each character string being associated with a corresponding one of the plurality of specified items contained in the plurality of documents and included in the item information;

in response to extracting the plurality of character strings associated with the item information from the read image, setting a split position, the split position being a position at which to split out a portion of the read image as a set of documents, the portion being a portion of the read image from a first page where the extracting has begun to a last page containing a last extracted character string in the plurality of documents; and outputting the read image split accordance with the split position.

* * * * *